United States Patent
Fang et al.

(10) Patent No.: US 12,244,229 B2
(45) Date of Patent: *Mar. 4, 2025

(54) INDUCTOR CURRENT RECONSTRUCTION CIRCUIT, POWER CONVERTER AND INDUCTOR CURRENT RECONSTRUCTION METHOD THEREOF

(71) Applicant: Silergy Semiconductor Technology (Hangzhou) LTD, Hangzhou (CN)

(72) Inventors: Chiqing Fang, Hangzhou (CN); Zhiwei Xu, Hangzhou (CN); Kaiwei Yao, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 246 days.

This patent is subject to a terminal disclaimer.

(21) Appl. No.: 17/700,705

(22) Filed: Mar. 22, 2022

(65) Prior Publication Data

US 2022/0311338 A1 Sep. 29, 2022

(30) Foreign Application Priority Data

Mar. 25, 2021 (CN) .......................... 202110319108.7

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC .......................... H02M 1/0009; H02M 3/158
See application file for complete search history.

(56) References Cited

U.S. PATENT DOCUMENTS

| | | | |
|---|---|---|---|
| 7,372,241 B1* | 5/2008 | Tomiyoshi | H02M 3/1588 323/283 |
| 7,936,160 B1* | 5/2011 | Sheehan | H02M 3/156 323/288 |
| 8,581,518 B2 | 11/2013 | Kuang et al. | |
| 9,853,548 B1* | 12/2017 | Zhang | H02M 1/08 |
| 11,677,306 B2 | 6/2023 | Fang et al. | |
| 2011/0127925 A1 | 6/2011 | Huang et al. | |
| 2014/0239925 A1* | 8/2014 | Tanabe | H02M 3/158 323/271 |

(Continued)

OTHER PUBLICATIONS

SIPO, First Office Action, Feb. 28, 2024, China (translation of).

*Primary Examiner* — Harry R Behm

(57) ABSTRACT

An inductor current reconstruction circuit of a power converter can include: a switching current sampling circuit configured to acquire at least one of a current flowing through a main power transistor and a current flowing through a rectifier transistor to generate a switching current sampling signal; an inductor current generating circuit configured to generate a reconstruction signal representing an inductor current in one complete switching cycle; and where the reconstruction signal comprises the switching current sampling signal and a current analog signal generated according to the switching current sampling signal and an inductor voltage signal representing a voltage across an inductor in the power converter.

19 Claims, 9 Drawing Sheets

(56) References Cited

U.S. PATENT DOCUMENTS

| | | | |
|---|---|---|---|
| 2015/0222171 A1* | 8/2015 | Nguyen | H02M 1/08 |
| | | | 323/282 |
| 2017/0318639 A1 | 11/2017 | Wang et al. | |
| 2018/0295685 A1 | 10/2018 | Wang et al. | |
| 2018/0295690 A1 | 10/2018 | Chen et al. | |
| 2018/0310376 A1 | 10/2018 | Huang et al. | |

* cited by examiner

INDUCTOR CURRENT RECONSTRUCTION CIRCUIT, POWER CONVERTER AND INDUCTOR CURRENT RECONSTRUCTION METHOD THEREOF

RELATED APPLICATIONS

This application claims the benefit of Chinese Patent Application No. 202110319108.7, filed on Mar. 25, 2021, which is incorporated herein by reference in its entirety.

FIELD OF THE INVENTION

The present invention generally relates to the field of power electronics, and more particularly to inductor current reconstruction circuits, power converters, and inductor current reconstruction methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Switching power regulators or voltage regulators (VRs) are widely applied in various electronic systems to provide constant voltage and current for the load. For most power regulators, inductor current is detected and reported in real time. When the circuit is in a short-circuit condition, the current flowing through the transistor or other electronic components can be greater than the maximum current limit, such that the power transistors or other electronic components may be damaged. Therefore, inductor current can be required to be detected in real time. When it is not convenient to directly detect the output current in some applications, information of the output current can be obtained by information of the inductor current in a full switching cycle. Since there are space requirements, integration requirements or other electrical performance limitations in applications of detection of the inductor current in real time, the inductor current or the output current of the power regulators may not be directly detected.

Figure 1:
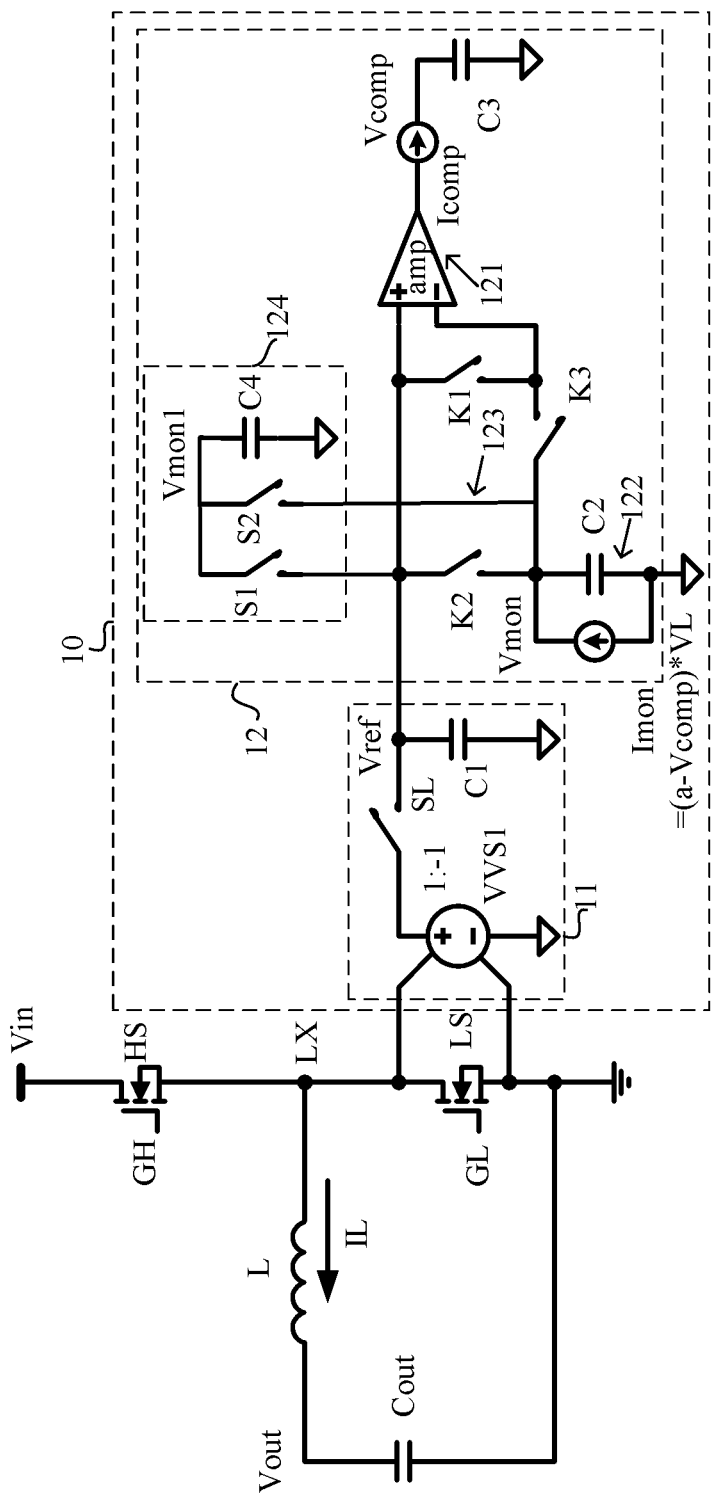
FIG. 1 is a schematic diagram of a first example an inductor current reconstruction circuit, in accordance with embodiments of the present invention.

Referring now to FIG. 1, shown is a schematic diagram of a first example inductor current reconstruction circuit, in accordance with the embodiments of the present invention. In this particular example, the power converter is a buck power converter. The buck power converter can include a power stage and inductor current reconstruction circuit. The power stage of the power converter can include main power transistor HS and rectifier transistor LS, inductor L, and output capacitor Cout. Inductor current reconstruction circuit 10 can include switching current sampling circuit 11 and inductor current generating circuit 12. Switching current sampling circuit 11 may generate switching current sampling signal Vref according to at least one of current I1 flowing through main power transistor HS and current I2 flowing through rectifier transistor LS in the power converter. Inductor current generating circuit 12 may generate reconstruction signal Vmon1 representing the waveform of inductor current IL in the complete switching cycle according to switching current sampling signal Vref and inductor voltage signal VL representing the voltage across inductor L, in order to track inductor current IL.

It should be noted that inductor voltage signal VL can be obtained by directly detecting the voltage across inductor L, or by indirectly obtained in other indirect detection methods without directly detecting the voltage across inductor L. In particular embodiments, switching current sampling circuit 11 can generate switching current sampling signal Vref by obtaining at least one of the voltage across main power transistor HS and the voltage across rectifier transistor LS. In this embodiment, switching current sampling circuit 11 can generate switching current sampling signal Vref by directly acquiring at least one of the voltage across main power transistor HS and the voltage across rectifier transistor LS.

In one embodiment, switching current sampling circuit 11 may generate switching current sampling signal Vref according to at least one of current I1 flowing through main power transistor HS and current I2 representing the current flowing through rectifier transistor LS in the power converter. In one switching cycle, when at least one of the main power transistor and the rectifier transistor is configured as a detected transistor, the switching current sampling signal can be configured as one part of the reconstruction signal in a first time interval of a conduction time interval of the detected transistor. Also, a current analog signal generated according to the switching current sampling signal and the inductor voltage signal in a remaining time interval of the switching cycle excluding the first time interval of the detected transistor, can be configured as a remaining part of the reconstruction signal.

In one example, inductor current generating circuit 12 can, when one of main power transistor HS and rectifier transistor LS in the power converter is a detected transistor, during a first interval of a conduction time interval of the detected transistor, control switching current sampling signal Vref to be a part of reconstruction signal Vmon1 representing the inductor current. During the remaining time interval of the switching cycle excluding the first time interval of the detected transistor, inductor current generating circuit 12 can generate the current analog signal as a remaining part of reconstruction signal Vmon1 according to switching current sampling signal Vref and inductor voltage signal VL across the inductor in the power converter. Switching current sampling circuit 11 can obtain switching current sampling signal Vref by detecting the voltage across the on-resistor of the detected transistor, such that the phase of switching current sampling signal Vref may correspond to the actual direction of the inductor current in real time.

In one embodiment, switching current sampling circuit 11 can include voltage-controlled voltage source VVS1, sampling switch SL and first capacitor C1. Voltage-controlled voltage source VVS1 can detect the voltage across rectifier transistor LS, and may generate switching current sampling signal Vref representing the current flowing through rectifier transistor LS and being proportional to the voltage across rectifier transistor LS. Since the transistor has a fixed on-resistor Rdson when the transistor is turned on, the drain-source voltage of the transistor detected can be proportional to the current flowing through the transistor. In addition, because the current flows from the source terminal to the drain terminal of rectifier transistor LS when rectifier transistor LS is turned on, the drain-source voltage of rectifier transistor LS is negative. In order to facilitate the design of the latter circuit, the coefficient of voltage-controlled voltage source VVS1 can be negative such that switching current sampling signal Vref is positive. Here, 1:−1 may be selected as the coefficient of voltage-controlled voltage source VVS1. Those skilled in the art will recognize that the coefficient of voltage-controlled voltage source VVS1 can also be selected with other values in different designs. Moreover, sampling switch SL can be turned on for a period of time when rectifier transistor LS is turned on, such that switching current sampling signal VREF is maintained on capacitor C1.

In one example, inductor current generating circuit 12 can include error amplifying circuit 121, reconstruction signal generation circuit 122, switch circuit 123, and reconstruction signal output circuit 124. Error amplifying circuit 121 can generate error compensation signal Vcomp according to switching current sampling signal Vref and analog reconstruction signal Vmom. Reconstruction signal generation circuit 122 can selectively receive switching current sampling signal Vref via switch circuit 123, and adjust the output current of controllable current source Imon according to error compensation signal Vcomp and inductor voltage signal VL. The output current of controllable current source Imon can charge and discharge capacitor C2, in order to generate analog reconstruction signal Vmon across capacitor C2. Here, the output current of controllable current source Imon is positively correlated with inductor voltage signal VL and negatively correlated with error compensation signal Vcomp. For example, the relationship between current source Imon, inductor voltage signal VL, and error compensation signal Vcomp may meet the following formula: Imon=(a−Vcomp)*VL, where "a" is a constant.

For example, error amplifying circuit 121 can include error amplifier "amp". The non-inverting input terminal of error amplifier amp can selectively receive one of analog reconstruction signal Vmon and switching current sampling signal Vref through switch circuit 123. In one example, reconstruction signal output circuit 124 can output switching current sampling signal Vref in the first interval as part of reconstruction signal Vmon1 representing the inductor current. Also, in a remaining time interval of the switching cycle excluding the first time interval of the detected transistor, reconstruction signal output circuit 124 can output analog reconstruction signal Vmon across capacitor C2 as a remaining part of reconstruction signal Vmon1. Here the current analog signal is a part of analog reconstruction signal Vmon.

Reconstruction signal output circuit 124 can include output switches S1 and S2. One terminal of output switch S1 can connect to the output terminal of switching current sampling circuit 11 to receive switching current sampling signal Vref, and the other terminal of output switch S1 can connect to the output terminal of reconstruction signal output circuit 124. The output switch S1 can be turned on during the first interval to transmit switching current sampling signal Vref to the output terminal of reconstruction signal output circuit 124. One terminal of output switch S2 can connect to the output terminal of reconstruction signal generating circuit 122 to receive analog reconstructed signal Vmon, and the other terminal of output switch S2 can connect to the output terminal of reconstruction signal output circuit 124. Output switch S2 can be turned on in a remaining time interval of the switching cycle excluding the first time interval of the detected transistor to transmit the analog reconstruction signal to the output terminal of the reconstruction signal output circuit.

Further, error amplifier circuit 121 can include an error amplifier amp. A non-inverting input terminal of error amplifier amp can receive switching current sampling signal Vref, and an inverting input terminal of error amplifier amp is short-circuited with the non-inverting input terminal through a switch, or through another switch that can connect to analog reconstruction signal Vmon. Reconstruction signal generation circuit 122 can include controllable current source Imon and capacitor C2, and the output current of controllable current source Imon can be related to compensation signal Vcomp and inductor voltage signal VL. Reconstruction signal generation circuit 122 can selectively receive switching current sampling signal Vref through switch circuit 123. Analog reconstruction signal Vmon can be generated across second capacitor C2. Further, the output current of controllable current source Imon can be (a−Vcomp)*VL, where a is a constant value.

In one embodiment, switch circuit 123 can include switches K1, K2, and K3. Switch K1 can connect between two input terminals of error amplifier amp, switch K2 can connect between switching current sampling signal Vref and analog reconstruction signal Vmon, and switch K3 can connect between analog reconstruction signal Vmon and an inverting input terminal of error amplifier amp. In this embodiment, when one of main power transistor HS and rectifier transistor LS in the conducting state can be configured as a detected transistor, and during the first interval of the conduction time interval of the detected transistor, a current tracking signal can be generated according to switching current sampling signal Vref. During at least part of an off-time interval of the detected transistor, a current analog signal that follows the change of the inductor current can be generated according to the current tracking signal and inductor voltage signal VL. The current tracking signal can be continuous with the current analog signal, and both the current tracking signal and the current analog signal may be configured as parts of the inductor current reconstruction signal. The current tracking signal and the current analog signal are both continuous, and may be used as part of analog reconstruction signal Vmon.

During a first part of the conduction time interval of the detected transistor, the analog reconstruction signal can track the switching current sampling signal in real time by switch circuit 123, in order to control the current tracking signal to be consistent with (e.g., the same as) switching current sampling signal Vref. For example, when switches K1 and K3 are turned off and switch K2 is turned on, capacitor C2 can be directly connected to the output terminal of switching current sampling signal Vref, such that the current tracking signal (e.g., analog reconstruction signal Vmon in the first part of the first time interval of the conduction time interval of the detected transistor) is consistent with switching current sampling signal Vref.

In a second part of the first time interval of the conduction time interval of the detected transistor, analog reconstruction signal Vmon can be coupled to one input terminal of the error amplifying circuit by switch circuit 123, and the current tracking signal (e.g., analog reconstruction signal Vmon) can be adjusted according to the error between analog reconstruction signal Vmon and switching current sampling signal, in order to track the change rate of the inductor current, and thereby adjusting the output current of the controllable current source. For example, when switches K1 and K2 are turned off and switch K3 is turned on, the error amplifying circuit may receive switching current sampling signal Vref and analog reconstruction signal Vmon, and then can generate error compensation signal Vcomp according to switching current sampling signal Vref and analog reconstruction signal Vmon, in order to adjust output current Imon. Therefore, the current tracking signal can track switching current sampling signal Vref by a negative feedback adjustment. In at least one part of an off-time interval of the detected transistor, the output current of the controllable current source may be adjusted to generate the current analog signal consistent with and continuous with the current tracking signal according to the inductor voltage signal.

It should be noted that, the time length of the conduction time of main power transistor HS, or rectifier transistor LS, which can be configured as the detected transistor, may be greater than the time length of a second time interval, where the second interval can be configured as a preset blanking time. Thus inductor current reconstruction circuit 10 can set blanking time Tb, and whether main power transistor HS or rectifier transistor LS participate in the generation of analog reconstruction signal Vmon may be determined by whether the on conduction time corresponding to each transistor is greater than blanking time Tb. The current analog signal can be generated according to the current tracking signal when the conduction time of the main power transistor and/or the rectifier transistor is greater than the blanking time.

During the second interval of the conduction time interval of the detected transistor, the current tracking signal may not be generated, and the second interval can include a conduction moment of the detected transistor, and the time length of the second interval can be the consistent with the blanking time. During the second interval of the conduction time of the detected transistor, the current analog signal can be generated. Optionally, in the second time interval of the conduction time interval of the detected transistor, the current analog signal can be generated.

In particular embodiments, switching current sampling circuit 11 may be configured to one of the switching current flowing through main power transistor HS and the switching current flowing through rectifier transistor LS, or detect both the switching current flowing through main power transistor HS and the switching current flowing through rectifier transistor LS. Regardless of whether one transistor is to be detected or two transistors are to be detected, the transistor can be configured as the detected transistor only when the conduction time of the transistor is greater than the blanking time.

When only one transistor is detected and the on-time of the transistor is greater than the blacking time in one switching cycle, the current analog signal may be generated according to the switching current flowing through the detected transistor. When both two transistors are detected, at least one of the on-time of the main power transistor and the on-time of the rectifier transistor may be greater than the blanking time in one switching cycle. In such a case, if only one of the on-time of the main power transistor and the on-time of the rectifier transistor is greater than the blanking time is greater than the blanking time, the current analog signal may be generated according to the current flowing through this transistor. In addition, if both the on-times of the two transistors are greater than the blanking time, the current analog signal may be generated according to the switching current sampling signal representing the current flowing through the main power transistor and the rectifier transistor.

In one switching cycle, reconstruction signal Vmon1 can include the current tracking signal that tracks the switching current sampling signal of the main power transistor, the current analog signal that is continuous with the current tracking signal that tracks the switching current sampling signal of the main power transistor, the current tracking signal that tracks the switching current sampling signal of the rectifier transistor, and the current analog signal that is continuous the current tracking signal that tracks the switching current sampling signal of the rectifier transistor.

Figure 2:
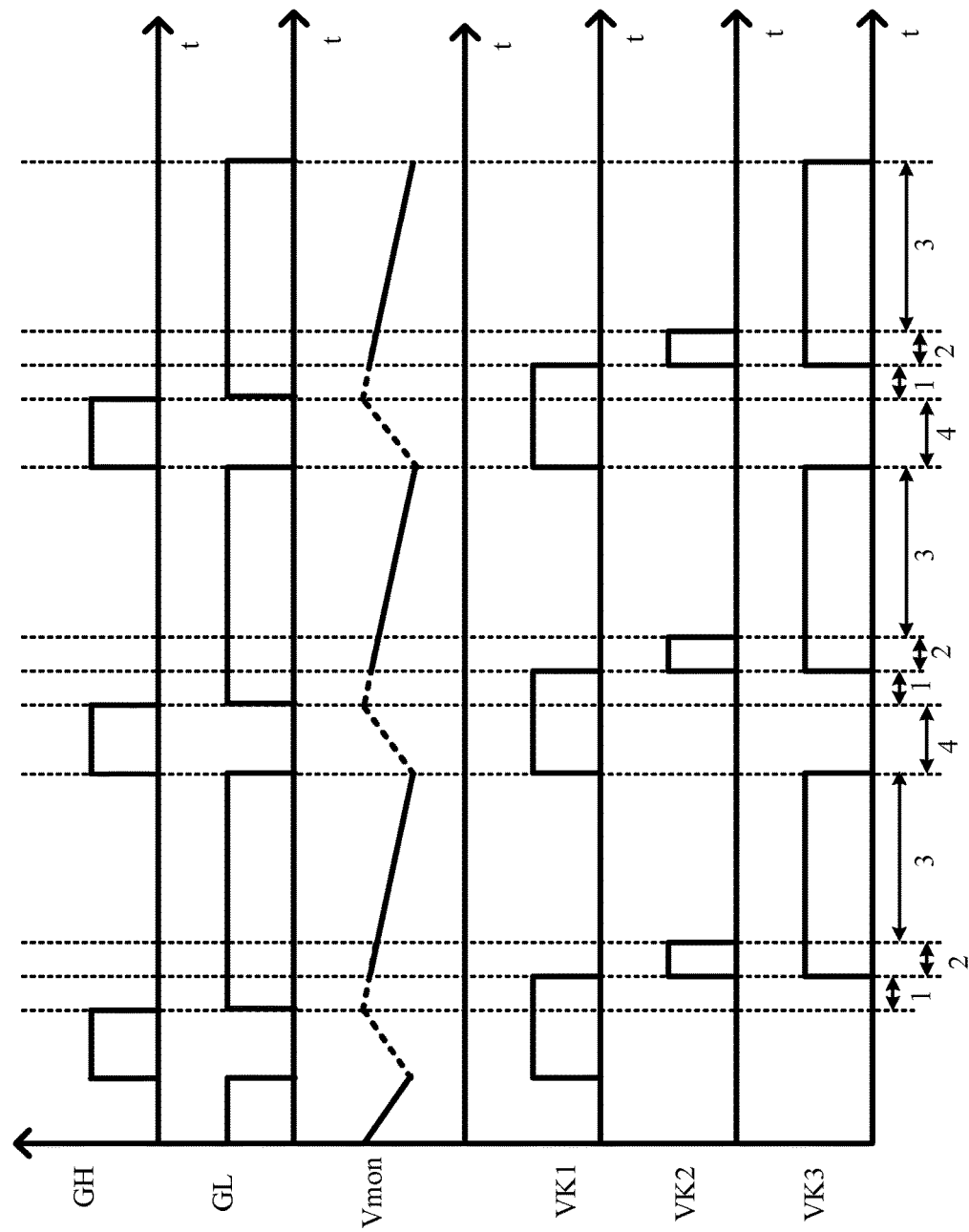
FIG. 2 is a waveform diagram of a first example operation of the inductor current reconstruction circuit, in accordance with embodiments of the present invention.

Referring now to FIG. 2, shown is a waveform diagram of an example inductor current reconstruction circuit, in accordance with the embodiments of the present invention. In this particular example, the reconstruction process of the inductor current in the entire switching cycle is described by taking as an example that only rectifier transistor LS is detected and participates in the generation of analog reconstruction signal Vmon. In stage 2, rectifier transistor LS can be turned on. The stage 2 may begin after rectifier transistor LS is turned on for the time length of blanking time Tb, and may end before the turn-off moment of rectifier transistor LS. In stage 2, switches K2 and K3 can be turned on, and switch K1 may be turned off. It can be seen that analog reconstruction signal Vmon and switching current sampling signal Vref are short-circuited through switch K2. In such a case, the value of analog reconstruction signal Vmon can be equal to or very close to the value of switching-current sampling signal Vref; that is, the starting point of analog reconstruction signal Vmon is the same as that of switching current sampling signal Vref. In this stage, output switch S1 can be turned on and output switch S2 turned off, thus switching current sampling signal Vref may be output to the output terminal of reconstruction signal output circuit 124, and configured as reconstruction signal Vmon1.

In stage 3, switches K1 and K2 can be turned off and switch K3 turned on. Analog reconstruction signal Vmon can track the current flowing through rectifier transistor LS by negative feedback regulation (e.g., analog reconstruction signal Vmon tracks switching-current sampling signal Vref). When analog reconstruction signal Vmon switches to be greater than switching current sampling signal Vref, error compensation signal Vcomp may decrease such that the output current of current source Imon increases. Since inductor voltage signal VL is negative (e.g., −Vout), the output current of current source Imon can discharge capacitor C2. In such a case, the discharging rate for capacitor C2 may be increased, thereby controlling analog reconstruction signal Vmon to be consistent with switching-current sampling signal Vref. In stage 3, analog reconstruction signal Vmon may realize the tracking for the current flowing through rectifier transistor Ls, and the output current of the current source represents the change rate of the inductor current. That is, the change rate of analog reconstruction signal Vmon can be the same as that of switching current sampling signal Vref by negative feedback regulation. In this stage, output switch S1 is turned on and output switch S2 is turned off, thus switching current sampling signal Vref can be output to the output terminal of reconstruction signal output circuit 124, and configured as reconstruction signal Vmon1.

In stage 4, main power transistor HS can be turned on, rectifier transistor LS turned off, switches K2 and K3 turned off, and switch K1 turned on. In this case, both the two input terminals of error amplifier amp may receive switching current sampling signal Vref, such that error compensation signal remains the same. Here, inductor voltage signal VL=Vin−Vout, and inductor voltage signal VL is positive. Further, the output current of the voltage-controlled voltage source Imon1=Imon_0*(Vin−Vout)/(Vout). Here, Imon_0 represents the change rate of the inductor current obtained in stage 3. The change rate of the inductor current can be the ratio of the voltage across the inductor to the inductance of the inductor. In stage 3, the voltage across the inductor is Vout and the voltage across the inductor is Vin−Vout in stage 4. Therefore, the output current of the voltage-controlled voltage source Imon1, which represents the change rate of the inductor current, can be obtained by the following formula: Imon_1=Imon_0*(Vin−Vout)/(Vout). The voltage across capacitor C2 can increase with a change rate that is the same as the change rate of the inductor current in stage 4 from the voltage across capacitor C2 at the ending moment of stage 3 until the rectifier transistor is turned on again.

In stage 4, the inductor current can be simulated by the current analog signal without directly obtaining the information of the inductor current. In this stage, output switch S1 can be turned off and output switch S2 turned on, thus analog reconstruction signal Vmon can be output to the output terminal of reconstruction signal output circuit 124, and configured as reconstruction signal Vmon1.

In stage 1, when rectifier transistor LS starts to be turned on, oscillation on drain-source voltage Vds of rectifier transistor LS can greatly affect the detection result. Therefore, a certain blanking time Tb may be set, and the current signal flowing through rectifier transistor LS can be ignored in this stage. For example, switch K2 (e.g., the control signal for switch K2 is signal S2) and switch K3 (e.g., the control signal for switch K3 is signal S3) are turned off, and sampling switch SL and switch K1 (e.g., the control signal for switch K1 is signal S1) are turned on. Therefore, the signals received by the input terminals of error amplifier amp are the same, such that the current of error amplifier amp and error compensation signal Vcomp are zero. In this stage, the value of inductor voltage signal VL may switch to be −Vout from Vin−vout, and the output current of current source Imon can change to discharge capacitor C2. Therefore, analog reconstruction signal Vmon may decrease from the peak value of analog reconstruction signal Vmon with a fixed change rate. Moreover, the fixed change rate can be the same as change rate Imon_0 representing the change rate of inductor current IL in stage 3. In this stage, output switch S1 is turned off and output switch S2 is turned on, thus analog reconstruction signal Vmon can be output to the output terminal of reconstruction signal output circuit 124, and configured as reconstruction signal Vmon1.

As mentioned above, the principle of reconstruction of the inductor current in the complete switching cycle by only detecting the current of one transistor is, in stage 3, the value of inductor voltage signal VL is −Vout, and change rate k3 of the inductor current in stage 3 of the inductor current is (−Vout)/L. Also, in stage 4, the value of inductor voltage signal VL is Vin−Vout, and change rate k4 of the inductor current of the inductor current is (Vin−Vout)/L. Therefore, change rate k4 of the inductor current can be obtained.

In particular embodiments, in stage 2, analog reconstruction signal Vmon may be forced to be equal to switching-current sampling signal Vref. In stage 3, the change rate of analog reconstruction signal Vmon can be controlled to be equal to that of switching current sampling signal Vref by negative feedback regulation. Moreover, the analog reconstruction signal in other stages can be obtained according the relationship between the voltage and the current. Therefore, the waveform of the inductor current in the complete switching cycle can be reconstructed only by detecting the switching current of one transistor.

In the inductor current reconstruction circuit of particular embodiments, in the first interval of the conduction time interval of the detected transistor, switching current sampling signal Vref can be configured as reconstruction signal Vmon1 characterizing the inductor current, in order to avoid errors caused by analog reconstruction signal Vmon representing the inductor current not being fully established during the startup phase or other operating conditions. In other intervals of the detected transistor except the first interval, the current analog signal can be configured as reconstruction signal Vmon1, and can be generated according to switching current sampling signal Vref and inductor voltage signal VL representing the voltage across the inductor in the power converter. Therefore, reconstruction signal Vmon1 can be partly a signal obtained by direct sampling, and partly a signal by simulating, which can be spliced in time. This enables reconstruction signal Vmon1 to more accurately track the inductor current within a complete switching cycle.

Figure 3:
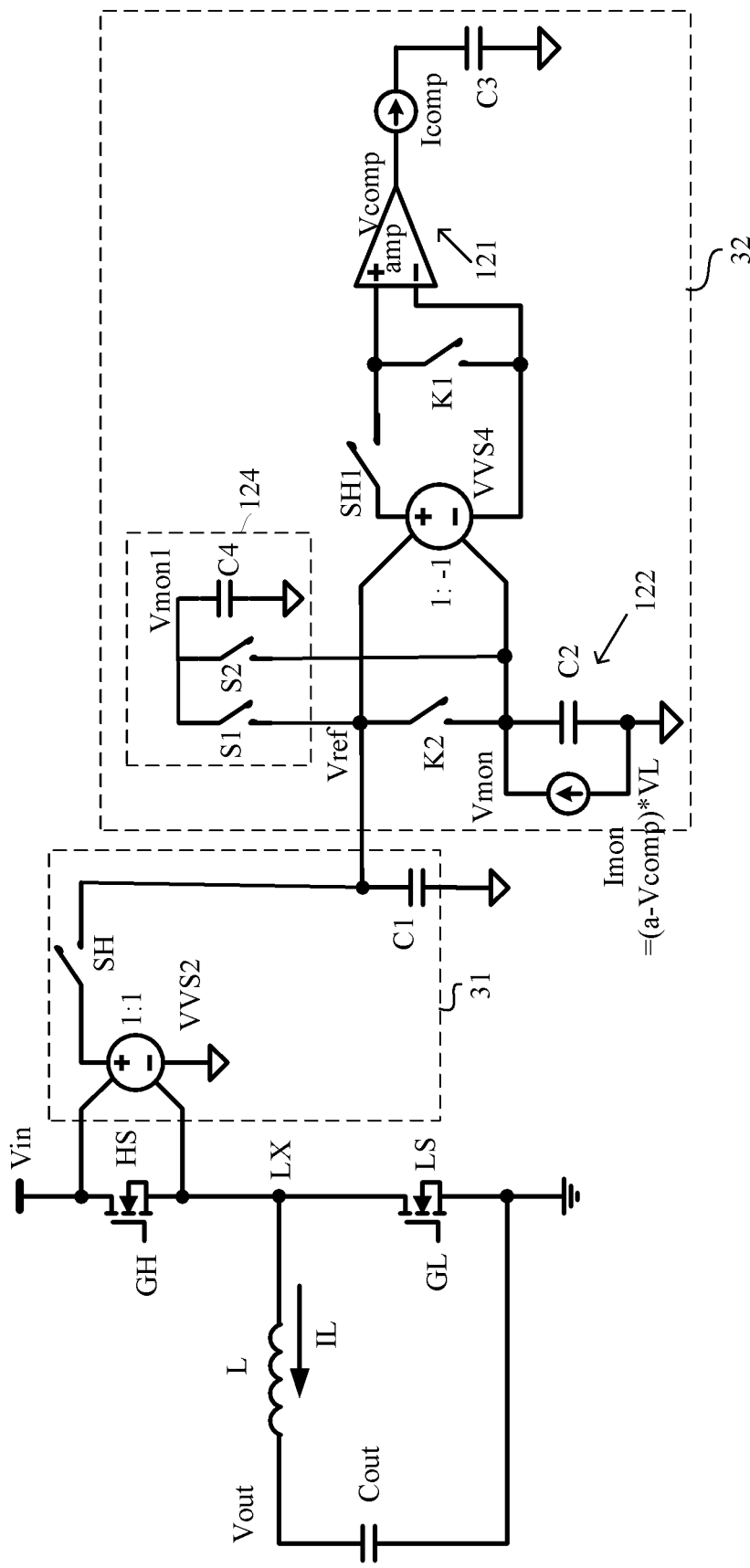
FIG. 3 is a schematic diagram of a second example an inductor current reconstruction circuit, in accordance with embodiments of the present invention.

Referring now to FIG. 3, shown is a schematic diagram of a third example inductor current reconstruction circuit, in accordance with the embodiments of the present invention. The difference between this embodiment and inductor current reconstruction circuit 10 in the first embodiment is only that switching current sampling circuit 31 samples the current flowing through main power transistor HS. Also, as compared with inductor current generating circuit 12, voltage controlled voltage source VVS4 and control switch SH1 are added in inductor current generating circuit 32.

In FIG. 3, switching current sampling circuit 31 can include voltage-controlled voltage source VVS2, sampling switch SH, and capacitor C1. Voltage-controlled voltage source VVS2 can acquire switching current sampling signal Vref representing the current flowing through main power transistor HS by detecting the voltage across main power transistor HS and being proportional to the voltage across main power transistor HS. Different from when rectifier transistor LS is turned on, when main power transistor HS is turned on, the current flows from the drain terminal to the source terminal of main power transistor HS when main power transistor HS is turned on, the drain-source voltage of main power transistor HS is positive. Therefore, the coefficient of voltage-controlled voltage source VVS2 can be set to be positive, in order to achieve a certain proportional change for the drain-source voltage of main power transistor HS. Here, 1:1 is selected as the coefficient of voltage-controlled voltage source VVS2. In addition, when the coefficient is 1:1, voltage-controlled voltage source VVS2 can also be omitted. Sampling switch SH can be turned on for a period of time when main power transistor HS is turned on, such that switching current sampling signal Vref can be held on capacitor C1.

In inductor current generating circuit 32, voltage-controlled voltage source VVS4, and control switch SH1 can be added to the input terminals of error amplifier amp. For example, control switch SH1 and sampling switch SH can be turned on and off synchronously. Since the change rate of the inductor current is positive when main power transistor is turned on, and the change rate of the inductor current is negative when rectifier transistor is turned on, the change direction of error compensation signal Vcomp when main power transistor is turned on may be required to be opposite to that of error compensation signal Vcomp when rectifier transistor is turned on. Therefore, the coefficient of voltage-controlled voltage source VVS4 may be required to be negative in this example such that the error amplifier can receive the error signal between the switching current sampling signal and the analog reconstruction signal with a different change direction. In this example, optionally, the coefficient of voltage-controlled voltage source VVS4 can be set to be 1:–1. The coefficient of voltage-controlled voltage source VVS4 can also be selected with other values in different designs.

Figure 4:
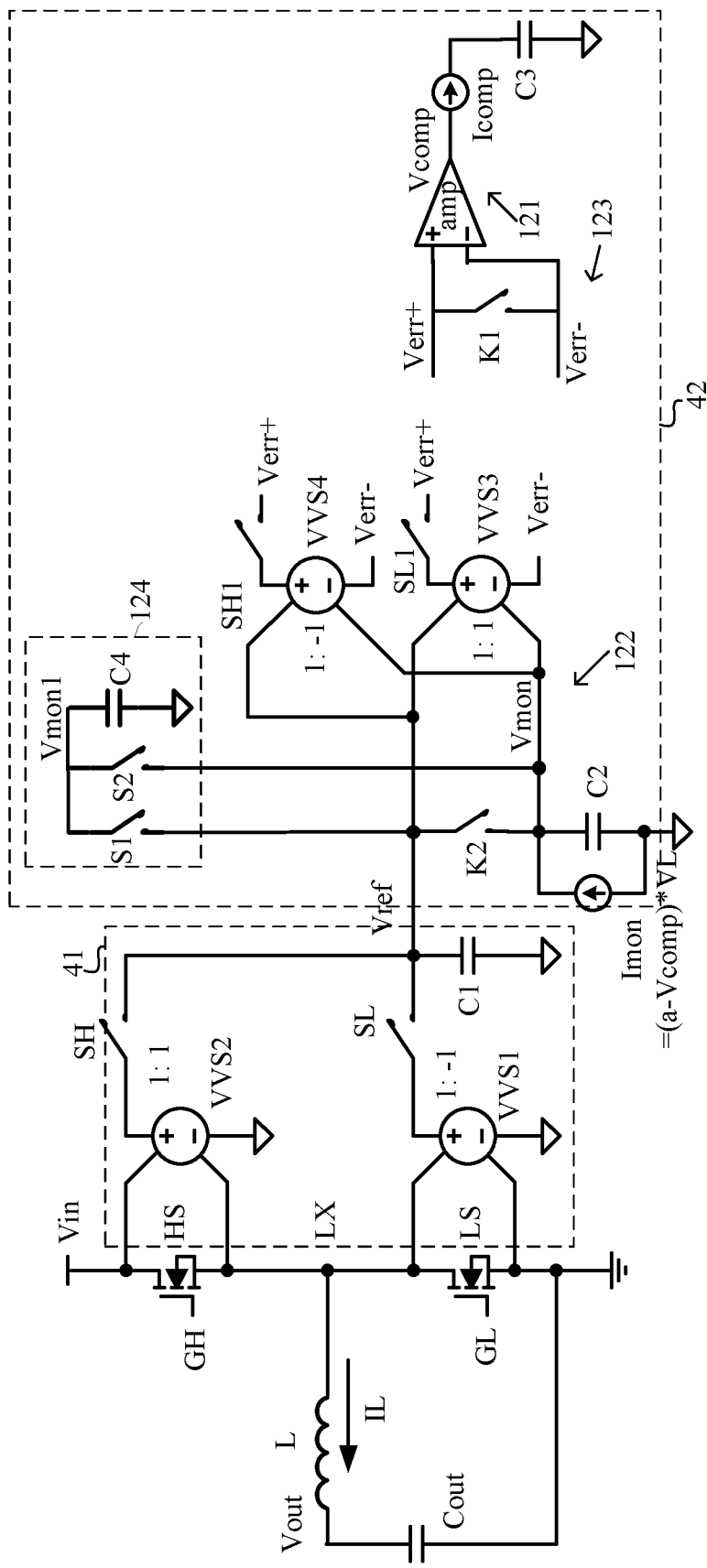
FIG. 4 is a schematic diagram of a third example an inductor current reconstruction circuit, in accordance with embodiments of the present invention.

Referring now to FIG. 4, shown is a schematic diagram of a third example inductor current reconstruction circuit, in accordance with the embodiments of the present invention. The difference between this embodiment and inductor current reconstruction circuit 10 in the first embodiment is that switching current sampling circuit 41 samples the current flowing through main power transistor HS and rectifier transistor LS, and compared with inductor current generating circuit 12, voltage controlled voltage source VVS4, control switch SH1, and voltage controlled voltage source VVS43 are added in inductor current generating circuit 42.

In FIG. 4, switching current sampling circuit 41 can include voltage-controlled voltage source VVS2, sampling switch SH, voltage-controlled voltage source VVS1, sampling switch SL, and capacitor C1. Voltage-controlled voltage source VVS2 can acquire switching current sampling signal Vref representing the current flowing through main power transistor HS during the conduction time of main power transistor HS by detecting the voltage across main power transistor HS. Voltage-controlled voltage source VVS1 can acquire switching current sampling signal Vref representing the current flowing through rectifier transistor LS during the conduction time of rectifier transistor LS by detecting the voltage across rectifier transistor LS.

In inductor current generating circuit 42, compared with inductor current generating circuit 12, voltage-controlled voltage source VVS4, control switch SH1, voltage-controlled voltage source VVS3, and control switch SL1 can be added to the input terminals of error amplifier amp. For example, control switch SH1 and sampling switch SH can be turned on and off synchronously, and control switch SL1 and sampling switch SL can be turned on and off synchronously. Since the slope of inductor current IL increases when main power transistor HS is turned on, and the slope of inductor current IL decreases when rectifier transistor LS is turned on, when main power transistor HS is turned on the change direction of the error compensation signal Vcomp may be different from that when rectifier transistor LS is turned on. Therefore, when rectifier transistor LS is turned on, if the proportional coefficient of voltage-controlled voltage source VVS3 is a positive value, such as 1:1 in this embodiment, the positive error between analog reconstruction signal Vmon and switching current sampling signal Vref can be input to error amplifier amp, and when main power transistor HS is turned on, the proportional coefficient of voltage-controlled voltage source VVS4 may be a negative value, such as 1:–1 in this embodiment. Therefore, when the coefficient of voltage controlled voltage source VVS3 is positive, the coefficient of voltage-controlled voltage source VVS4 may be required to be negative such that the error amplifier can receive the error signal with different change directions. In this example, optionally, the coefficient of voltage controlled voltage source VVS3 can be set to be 1:1, and the coefficient of voltage-controlled voltage source VVS4 can be set to be 1:–1. The coefficients of voltage-controlled voltage source VVS3 and voltage-controlled voltage source VVS4 can also be selected with other values in different designs.

It should be understood that other values of the proportional coefficient can be selected according to different parameter designs, such that the negative error between analog reconstruction signal Vmon and switching current sampling signal Vref can be input to error amplifier amp. By setting the positive or negative proportional coefficient, the negative error or positive error between analog reconstructed signal Vmon and switching current sampling signal Vref can be input to the error amplifier amp.

Figure 5:
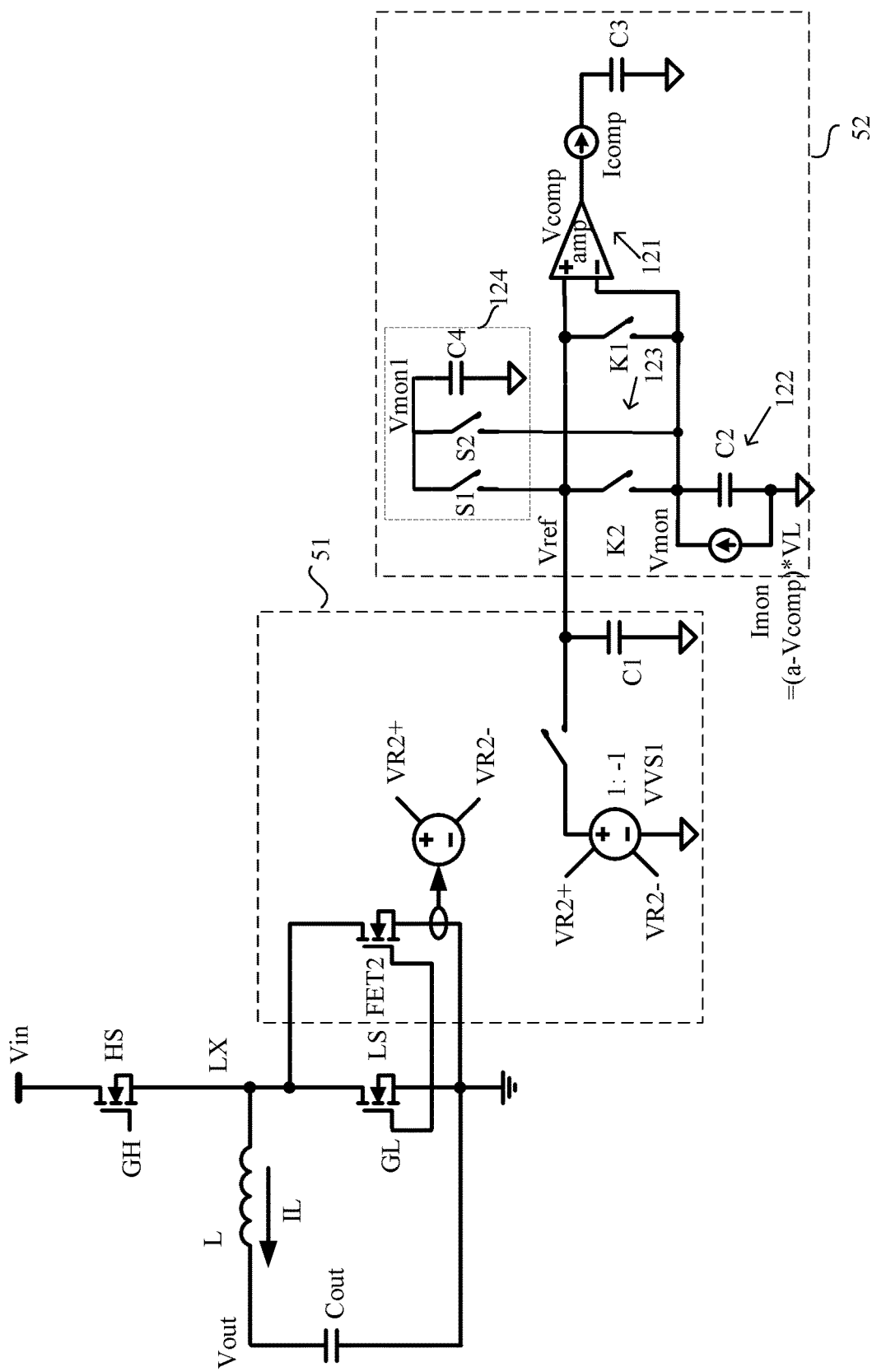
FIG. 5 is a schematic diagram of a fourth example inductor current reconstruction circuit, in accordance with embodiments of the present invention.

Referring now to FIG. 5, shown is a schematic diagram of a fourth example inductor current reconstruction circuit, in accordance with the embodiments of the present invention. The difference between this embodiment and inductor current reconstruction circuit 10 in the first embodiment is that switching current sampling circuit 51 samples the current flowing through rectifier transistor LS by a current mirror.

In one embodiment, switching current sampling circuit 51 can sample the current flowing through rectifier transistor LS by adopting mirror transistor FET2 that is cascode with rectifier transistor LS, in order to generate switching current sampling signal Vref. Thus, the current flowing through mirror transistor FET2 is proportional to the current flowing through rectifier transistor LS. By converting the current flowing through mirror transistor FET2 into two voltage signals VR2+ and VR2–, voltage-controlled voltage source VVS1 can receive voltage signals VR2+ and VR2–, or voltage signals proportional to voltage signals VR2+ and VR2–, in order to generate switching current sampling signal Vref representing the current flowing through rectifier transistor LS. As compared with the current information obtained by detecting the voltage in the embodiments shown in FIGS. 1, 3 and 4, the current signal here can be directly obtained by the current mirror circuit, which can avoid the influence of noise and the temperature drift of the resistor, and can improve the accuracy of the detection result. Moreover, the temperature of the mirror transistor may be close to that of the main power transistor or rectifier transistor, which may facilitate compensation.

Figure 6:
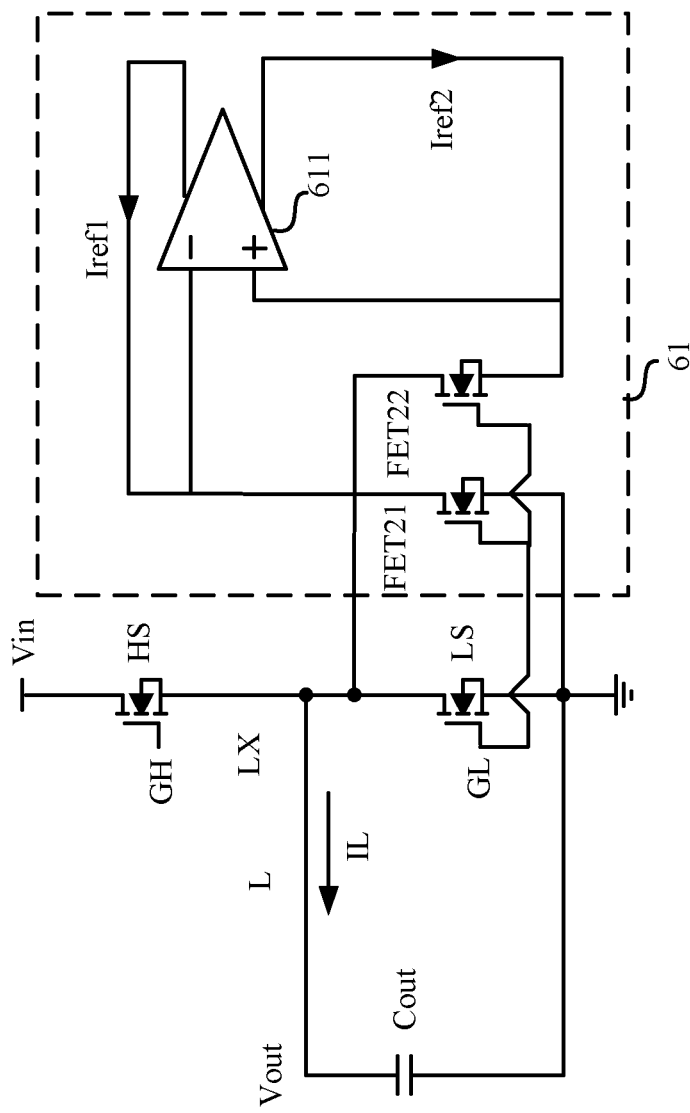
FIG. 6 is a schematic diagram of an example switching current sampling circuit, in accordance with embodiments of the present invention.

Referring now to FIG. 6, shown is a schematic diagram of an example switching current sampling circuit, in accordance with the embodiments of the present invention. In order to facilitate that the phase of switching current sampling signal Vref corresponds to the actual direction of the inductor current in real time, that is, the positive and negative values of switching current sampling signal Vref can reflect the two directions of the actual inductor current, a set of circuits can be used to realize. For the detection of positive and negative currents, this embodiment provides switching current sampling circuit 61 for the detection of positive and negative currents, which can be described here by taking only the detection of the current flowing through rectifier transistor LS as an example.

For example, switching current sampling circuit 61 can obtain the current flowing through main power transistor HS by mirror transistor FET1, which shares the source terminal and the gate terminal with main power transistor HS, in order to generate the switching current sampling signal VREF. Therefore, the current flowing through mirror transistor FET1 may be proportional to the current flowing through main power transistor HS. In this example, the current flowing through mirror transistor FET1 can be converted into two voltage signals VR1+ and VR1−. Voltage controlled voltage source VVS2 may obtain the voltage signals VR1+ and VR1−, and switching current sampling signal VREF characterizing the current flowing through main power transistor HS can be generated by a certain proportion change.

Further, switching current sampling circuit 61 can include differential amplifier 611 having two input terminals respectively connected to the drain terminal of mirror transistor FET21 and the source terminal of mirror transistor FET22, and two output terminals for respectively generating currents Iref1 and Iref2. Thus, switching current sampling signal Vref can be generated according to the difference between currents Iref1 and Iref2. By adopting this circuit, the actual direction of the inductor current can corresponds to the phase of the switching current sampling signal. Here, the phase of the switching current sampling signal refers to its positive and negative values.

Figure 7:
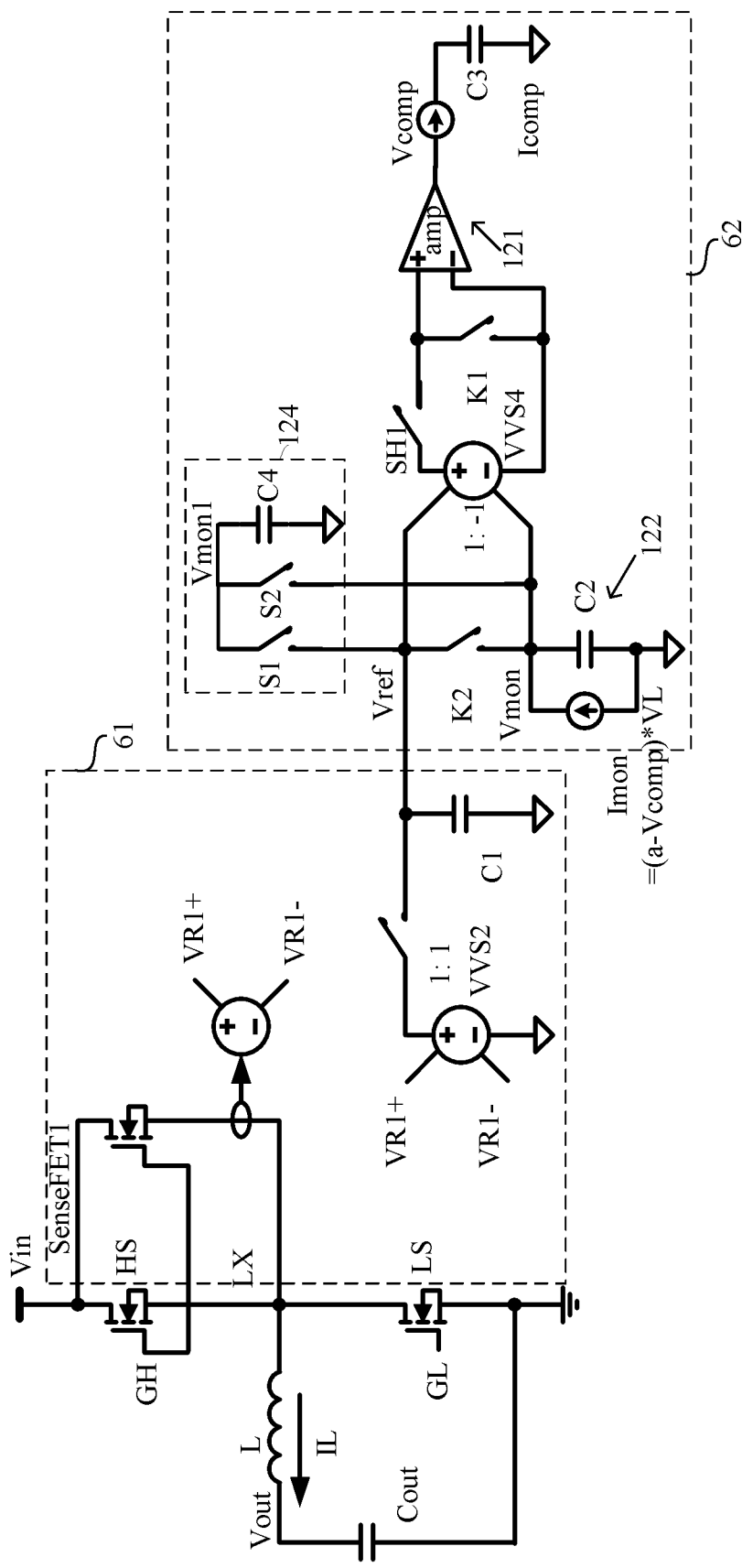
FIG. 7 is a schematic diagram of a fifth example inductor current reconstruction circuit, in accordance with embodiments of the present invention.

Referring now to FIG. 7, shown is a schematic diagram of a fifth example inductor current reconstruction circuit, in accordance with the embodiments of the present invention. The difference between this embodiment and inductor current reconstruction circuit 10 in the first embodiment is that switching current sampling circuit 81 samples the current flowing through main power transistor HS by a current mirror.

In one embodiment, switch current sampling circuit 81 can sample the current flowing through main power transistor HS by adopting mirror transistor FET1 which shares the source terminal and the gate terminal with main power transistor HS during the conduction time of main power transistor HS, in order to generate switching current sampling signal Vref. Thus, the current flowing through mirror transistor FET1 is proportional to the current flowing through main power transistor HS. By converting the current flowing through mirror transistor FET1 into two voltage signals VR1+ and VR1−, voltage-controlled voltage source VVS2 can receive voltage signals VR2+ and VR2−, or voltage signals proportional to voltage signals VR2+ and VR2−, in order to generate switching current sampling signal Vref representing the current flowing through main power transistor HS.

Figure 8:
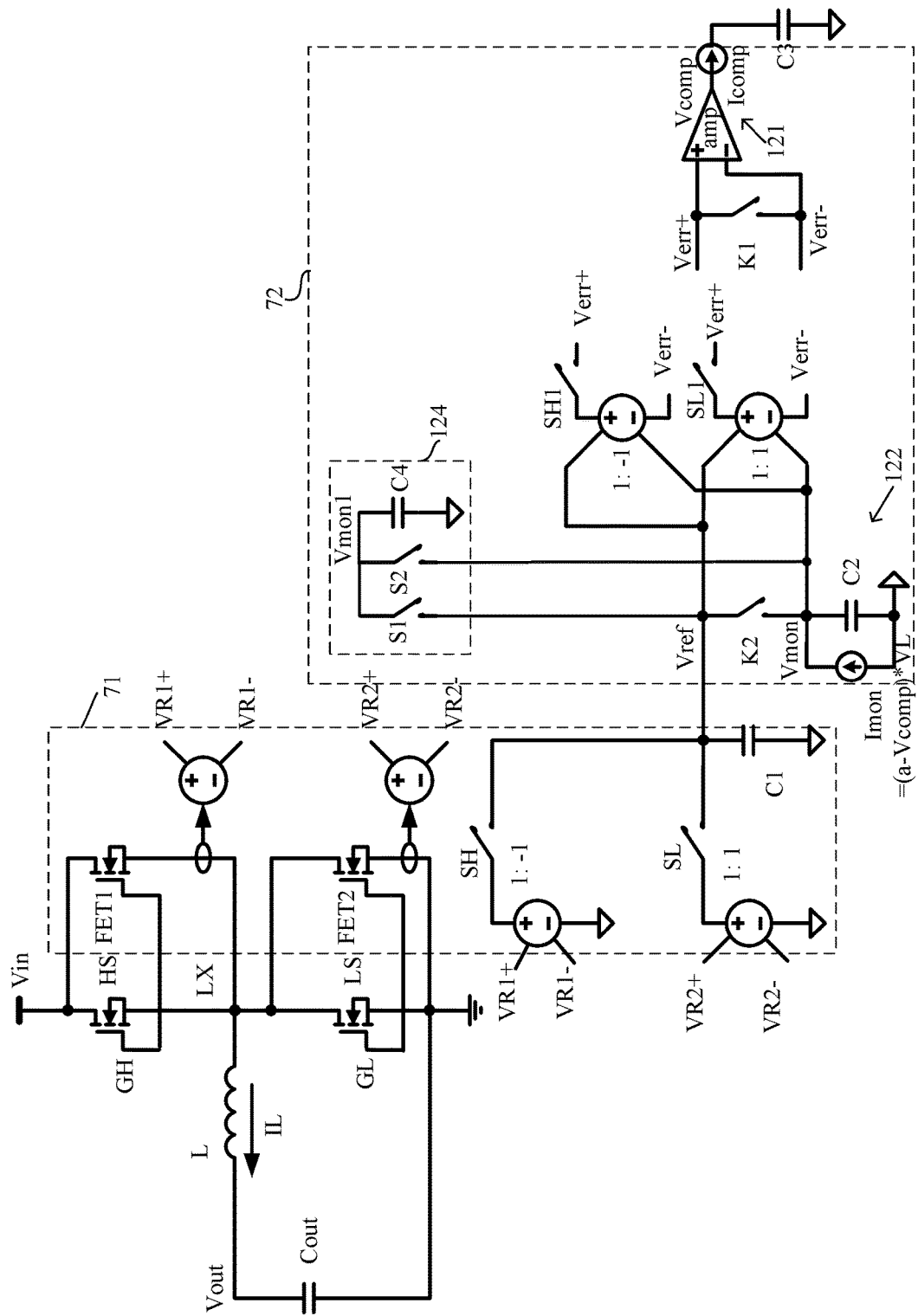
FIG. 8 is a schematic diagram of a sixth example inductor current reconstruction circuit, in accordance with embodiments of the present invention.

Referring now to FIG. 8, shown is a schematic diagram of a sixth example inductor current reconstruction circuit, in accordance with the embodiments of the present invention. The difference between this embodiment and inductor current reconstruction circuit 10 in the first embodiment is that switching current sampling circuit 81 samples the current flowing through main power transistor HS and rectifier transistor LS and by current mirrors.

In one embodiment, switch current sampling circuit 81 can sample the current flowing through main power transistor HS by adopting mirror transistor FET1 which shares the source terminal and the gate terminal with main power transistor HS during the conduction time of main power transistor HS, so as to generate switching current sampling signal Vref. Further, switch current sampling circuit 81 can sample the current flowing through rectifier transistor LS by adopting mirror transistor FET2 which shares the source terminal and the gate terminal with rectifier transistor LS during the conduction time of rectifier transistor LS, so as to generate switching current sampling signal Vref.

Figure 9:
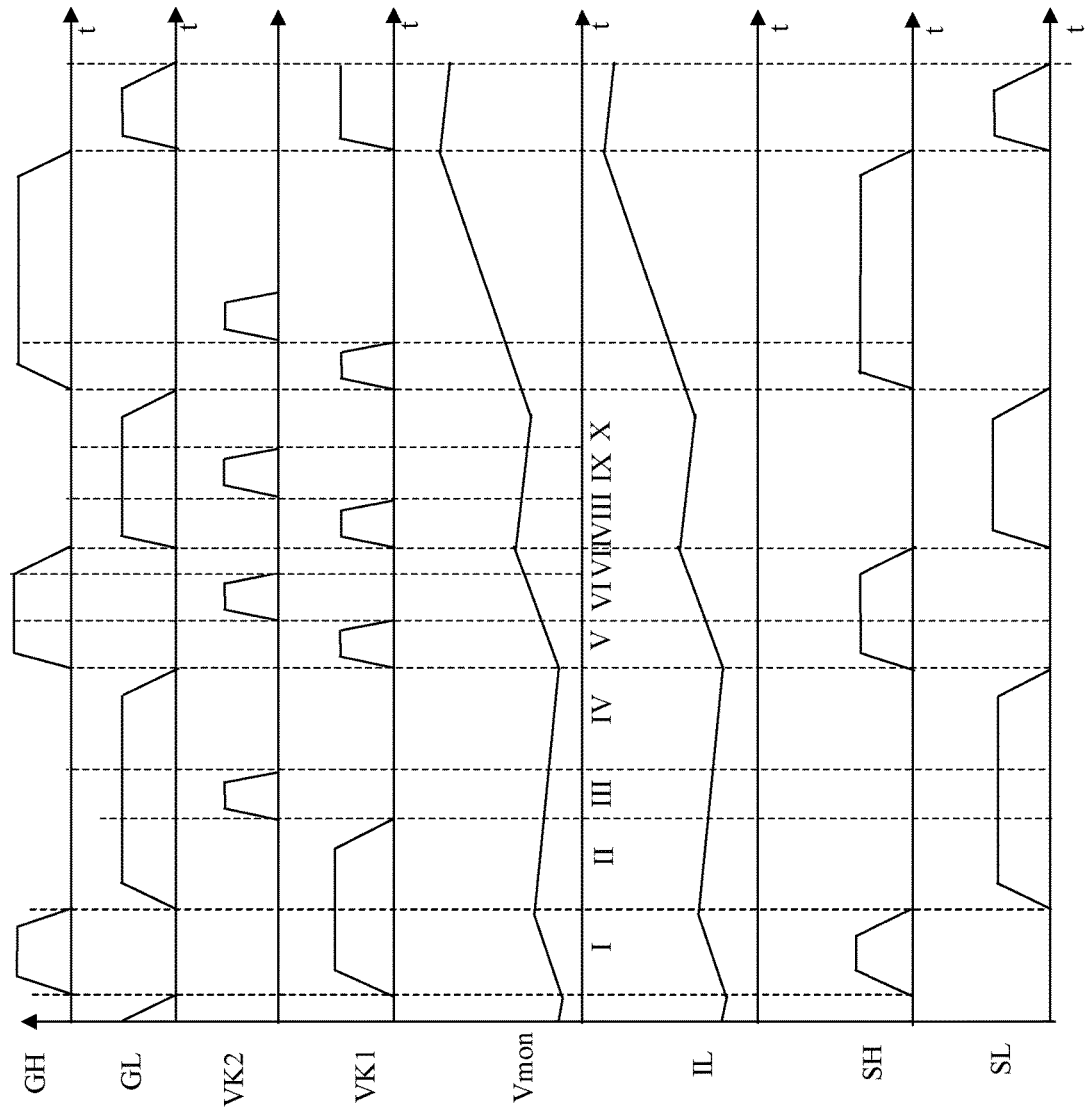
FIG. 9 is a waveform diagram of a second example operation of the inductor current reconstruction circuit, in accordance with embodiments of the present invention.

Referring now to FIG. 9, shown is a waveform diagram of another example operation of an inductor current reconstruction circuit, in accordance with the embodiments of the present invention. The operating principle of the inductor current reconstruction circuit of this embodiment will be described below with reference to the operating waveform shown in FIG. 9 and the inductor current reconstruction circuit of the sixth embodiment shown in FIG. 8. In this embodiment, the main power transistor and the rectifier transistor are detected at the same time to obtain the switching current sampling signal, and the time length of the conduction time of the main power transistor and the rectifier transistor is greater than the time length of the blanking time.

In order to illustrate the form of the inductor current reconstruction signal in one switching cycle, one of the main power transistor and the rectifier transistor can be set to be a "first" transistor and another one of the main power transistor and the rectifier transistor is set to be a "second" transistor. The inductor current reconstruction signal in one switching cycle can include: the switching current sampling signal in the first time interval of the conduction time interval of first transistor; the current analog signal in the blanking time of second transistor continuous with the first time interval of the conduction time interval of the first transistor; the switching current sampling signal in the first time interval of the conduction time interval of the second transistor; and the current analog signal in the blanking time of the first transistor continuous with the first time interval of the conduction time interval of the second transistor.

During the switching cycle, the reconstruction signal of the inductor current can include a current tracking signal generated during a first interval of the conduction time interval of one of the main power transistor and the rectifier transistor, a current signal generated by simulating and a current tracking signal generated during a blanking time of the other of the main power transistor and the rectifier transistor, and a current signal generated by simulating during a blanking time of one of the main power transistor and the rectifier transistor.

In period I, main power transistor HS is turned on, the conduction time of main power transistor HS can be set to be less than blanking time Tb, such that the sampling of main power transistor HS may not enabled. The input terminals of error amplifier amp can be short-circuited by switch K1, and switching current sampling signal representing the current flowing through main power transistor HS may not participate in the feedback adjustment. Analog reconstruction signal Vmon can be output and configured as reconstruction signal Vmon1.

In period II, which is similar to the first stage shown in FIG. 2, rectifier transistor LS is turned on, and the conduction time of rectifier transistor LS is greater than blanking time Tb. During blanking time Tb, the error amplifier can be short-circuited by switch K1, and the switching current sampling signal representing the current flowing through rectifier transistor LS may not participate in feedback adjustment. Analog reconstruction signal Vmon can be output and configured as reconstruction signal Vmon1.

In period III, which is similar to the second stage shown in FIG. 2, the conduction time of rectifier transistor LS is long enough, which is greater than blanking time Tb, the current sampling of rectifier transistor LS is enabled. Switch K1 is turned off, and switch K2 is turned on, such that the analog reconstruction signal is forced to be equal to the switching current sampling signal. Switching current sampling signal Vref can be output and configured as reconstruction signal Vmon1.

In period IV, which is similar to the third stage shown in FIG. 2, switches K1 and K2 are turned off, and sampling switch SL is also turned on, such that analog reconstruction signal Vmon can track the current flowing through rectifier transistor LS by the negative feedback adjustment circuit, specifically, that is, track switching current sampling signal Vref. Switching current sampling signal Vref can be output and configured as reconstruction signal Vmon1.

In period V, the next switching cycle begins to enter, the conduction time of main power transistor HS is greater than blanking time Tb. During blanking time Tb, error amplifier amp is short-circuited by switch K1, and the switching current sampling signal representing the current flowing through the rectifier transistor LS does not participate in feedback adjustment. Analog reconstruction signal Vmon can be output and configured as reconstruction signal Vmon1.

In period VI, which is the second stage of the conduction time of main power transistor HS, the conduction time of main power transistor HS is long enough, and is greater than blanking time Tb, and the current sampling of main power transistor HS can be enabled. Switch K1 is turned off, and switch K2 is turned on, such that analog reconstruction signal Vmon can be connect to switching current sampling signal Vref, in order to force analog reconstructed signal Vmon to be the target value. Switching current sampling signal Vref can be output and configured as reconstruction signal Vmon1.

In period VII, which is the third stage of the conduction time of main power transistor HS, switches K1 and K2 are turned off, sampling switch SH is turned on, and analog reconstruction signal Vmon can track the current flowing through main power transistor HS by the negative feedback adjustment circuit, that is, track switching current sampling signal Vref. Switching current sampling signal Vref can be output and configured as reconstruction signal Vmon1.

In period VIII, which is the first stage of the conduction time of rectifier transistor LS, rectifier transistor LS is just turned on, and the conduction time of rectifier transistor LS is greater than blanking time T. During blanking time Tb, error amplifier amp can be short-circuited by switch K1, and the switching current sampling signal representing the current flowing through the rectifier transistor LS may not participate in feedback adjustment. Analog reconstruction signal Vmon can be output and configured as reconstruction signal Vmon1.

In period IX, which is the second stage of the conduction time of rectifier transistor LS, rectifier transistor LS is turned on for a long enough time, and the current sampling of rectifier transistor LS is enabled. Further, switch K1 is turned off, and switch K2 is turned on to, such that analog reconstruction signal Vmon can be connected to switching current sampling signal Vref, in order to force analog reconstructed signal Vmon to be the target value. Switching current sampling signal Vref can be output and configured as reconstruction signal Vmon1.

In period X, which is the third stage of the conduction time of rectifier transistor LS. Further, switches K1 and K2 are turned off, sampling switch SL has been turned on, such that analog reconstruction signal Vmon can track the current flowing through rectifier transistor LS by the negative feedback adjustment circuit; that is, track switching current sampling signal Vref. During this switching cycle, both main power transistor HS and rectifier transistor LS participate in the regulation process. Switching current sampling signal Vref can be output and configured as reconstruction signal Vmon1.

According to the analysis of the above operating process, in one switching cycle, inductor current reconstruction circuit 10 can adjust analog reconstruction signal Vmon according to the sampling value of the current flowing through main power transistor HS and/or rectifier transistor LS. Whether or not the current flowing through main power transistor HS and rectifier transistor LS participates in the regulation process can be determined by whether the corresponding conduction time exceeds blanking time Tb. If the conduction time of the detected transistor reaches blanking time Tb, the corresponding sampling and control switch can be enabled, and the current sampling signal of the detected transistor can participate in the generation of analog reconstruction signal Vmon. In the inductor current reconstruction circuit of the present invention, a circuit based on a negative feedback adjustment can be designed, such that the reconstruction signal can track switching current sampling signal. By obtaining at least one of the current flowing through main power transistor HS and the current flowing through rectifier transistor LS, switching current sampling signal Vref can be generated, and the combination of the switching current sampling signal and the inductor voltage signal can realize the tracking of the inductor current within a complete switching cycle.

In particular embodiments, a power converter is also provided, which can include any of the above-mentioned inductor current reconstruction circuits, and also a main power transistor, a rectifier transistor, and a control circuit. The control circuit can generate a control signal according to the reconstruction signal to control the switching states of the main power transistor and the rectifier transistor.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An inductor current reconstruction circuit of a power converter, comprising:
   a) a switching current sampling circuit configured to acquire at least one of a current flowing through a main power transistor and a current flowing through a rectifier transistor to generate a switching current sampling signal;
   b) an inductor current generating circuit configured to generate a reconstruction signal representing an inductor current in one complete switching cycle;
   c) wherein the reconstruction signal comprises the switching current sampling signal and a current analog signal generated according to the switching current sampling signal and an inductor voltage signal representing a voltage across an inductor in the power converter;
   d) wherein a conduction time interval of a detected transistor comprises a first time interval during which the reconstruction signal is configured as the switching current sampling signal, and a second time interval during which the reconstruction signal is configured as the current analog signal, wherein a start moment of the second time interval is a turn-on moment of the detected transistor, and the second time interval is continuous with the first time interval; and
   e) wherein when one of the main power transistor and the rectifier transistor is configured as the detected transistor, the conduction time interval of the detected transistor is greater than the second time interval that is consistent with a blanking time, wherein a first slope signal representing a change rate of the inductor current is obtained according to the switching current sampling signal.

2. The inductor current reconstruction circuit of claim 1, wherein:
   a) in one switching cycle, when at least one of the main power transistor and the rectifier transistor is configured as the detected transistor, the switching current sampling signal is configured as one part of the reconstruction signal in the first time interval of the conduction time interval of the detected transistor; and
   b) the current analog signal generated according to the switching current sampling signal and the inductor voltage signal in a remaining time interval of the switching cycle excluding the first time interval of the detected transistor, is configured as a remaining part of the reconstruction signal.

3. The inductor current reconstruction circuit of claim 2, wherein:
   a) in a first part of the first time interval of the detected transistor, the inductor current generating circuit tracks the inductor current in real time to control a current tracking signal to be proportional to the inductor current, and outputs the switching current sampling signal as the reconstruction signal; and
   b) in a second part of the first time interval of the detected transistor, the inductor current generating circuit adjusts a change rate of the current tracking signal to track a change rate of the inductor current to obtain a first slope signal, and outputs the switching current sampling signal as the reconstruction signal.

4. The inductor current reconstruction circuit of claim 3, wherein:
   a) in the second part of the first time interval, the current tracking signal and the first slope signal are obtained by charging and discharging a capacitor through a controllable current source; and
   b) the output current of the controllable current source is adjusted according to an error between the switching current sampling signal in real time and the current tracking signal so as to control the current tracking signal to be consistent with the switching current sampling signal and the output current of the controlled current source represents the first slope signal.

5. The inductor current reconstruction circuit of claim 1, wherein a phase of the switching current sampling signal is controlled to correspond to a direction of the inductor current in real time.

6. The inductor current reconstruction circuit of claim 1, wherein the switching current sampling signal is generated by detecting a voltage of an on-resistance of a detected transistor.

7. The inductor current reconstruction circuit of claim 1, wherein a second slope signal is obtained according to the first slope signal and the change of the voltage across the inductor when the detected transistor is operated in the conduction time interval and an off-time interval of the detected transistor.

8. The inductor current reconstruction circuit of claim 7, wherein a ratio of the first slope signal to the second slope signal is proportional to a ratio of the inductor voltage signal in the conduction time interval to the inductor voltage signal in the off-time interval.

9. The inductor current reconstruction circuit of claim 7, wherein the current analog signal is generated according to the second slope signal and the switching current sampling signal in the off-time interval of the detected transistor.

10. The inductor current reconstruction circuit of claim 7, wherein in the off-time interval of the detected transistor and from an end moment of the first time interval, the value of the switching current sampling signal changes with the second slope, in order to generate the current analog signal.

11. The inductor current reconstruction circuit of claim 7, wherein in the second time interval of the detected transistor, and from an end moment of the off-time interval of the detected transistor, the value of the switching current sampling signal changes with the first slope, in order to generate the current analog signal.

12. The inductor current reconstruction circuit of claim 1, wherein when both the main power transistor and the rectifier transistor are configured as detected transistors, in one switching cycle, the inductor current reconstruction signal comprises:
   a) the switching current sampling signal in a first time interval of a conduction time interval of a first transistor that is one of the main power transistor and the rectifier transistor;
   b) the current analog signal in a second time interval of a conduction time interval of a second transistor that is another one of the main power transistor and the rectifier transistor continuous with the first time interval of the conduction time interval of the first transistor,
   c) the switching current sampling signal in a first time interval of the conduction time interval of the second transistor; and
   d) the current analog signal in a second time interval of the conduction time interval of the first transistor continuous with the first time interval of the conduction time interval of the second transistor.

13. The inductor current reconstruction circuit of claim 1, wherein the inductor current generating circuit comprises:

a) an error amplifying circuit configured to generate an error compensation signal according to the switching current sampling signal and an analog reconstruction signal;
b) a reconstruction signal generating circuit configured to selectively receive the switching current sampling signal by a switch circuit, and to adjust an output current of a controllable current source according to the error compensation signal and the inductor voltage signal; and
c) wherein the output current of the controllable current source charges and discharges a capacitor to generate the analog reconstruction signal across two terminals of the capacitor.

14. The inductor current reconstruction circuit of claim 13, wherein the inductor current generating circuit further comprises:
a) a reconstruction signal output circuit having a first output switch and a second output switch, wherein the first output switch is turned on to output the switching current sampling signal as the reconstruction signal in a first time interval of a conduction time interval of a detected transistor; and
b) wherein the second output switch is turned on to output the current analog signal configured as the reconstruction signal according to the switching current sampling signal and the inductor voltage signal in a remaining time interval of the switching cycle excluding the first time interval of the detected transistor.

15. The inductor current reconstruction circuit of claim 13, wherein:
a) in a first part of the first time interval, a first input terminal of the error amplifying circuit for receiving the switching current sampling signal is connected to a second terminal of the error amplifying circuit for receiving the analog reconstruction signal by the switch circuit;
b) in a second part of the first time interval, the first input terminal of the error amplifying circuit receives the switching current sampling signal, and the second terminal of the error amplifying circuit receives the analog reconstruction signal, and a change rate of the analog reconstruction signal is adjusted to be consistent with a change rate of the inductor current, in order to adjust the output current of the controllable current source; and
c) the analog reconstruction signal in the first time interval is a current track signal that tracks the switching current sampling signal in real time.

16. The inductor current reconstruction circuit of claim 15, wherein the output current of the controlled current source is adjusted to generate the current analog signal continuous with the current tracking signal according to the inductor voltage signal in at least part of an off-time interval of the detected transistor.

17. The inductor current reconstruction circuit of claim 15, wherein in a second interval of the conduction time interval of the detected transistor, the output current of the controlled current source is adjusted to generate the current analog signal according to the inductor voltage signal.

18. The inductor current reconstruction circuit of claim 1, wherein the switching current sampling circuit comprises:
a) a first mirror transistor having a same gate and source with a detected transistor; and
b) a second mirror transistor having the same gate and drain with the detected transistor.

19. The inductor current reconstruction circuit of claim 18, wherein:
a) the switching current sampling circuit comprises an error amplifier having a first input terminal coupled to the drain of the first mirror transistor and a second input terminal coupled to the source of the second mirror transistor, and having a first output terminal configured to generate a first current and a second output terminal configured to generate a second current; and
b) the switching current sampling signal is generated based on an error between the first current and the second current.

* * * * *